United States Patent
Tanaka et al.

(10) Patent No.: US 6,934,244 B2
(45) Date of Patent: Aug. 23, 2005

(54) OPTICAL RECORDING MEDIUM AND STAMPER FOR MANUFACTURING THE SAME

(75) Inventors: Tomiji Tanaka, Miyagi (JP); Masato Hattori, Kanagawa (JP)

(73) Assignee: Sony Corporation, Tokyo (JP)

( * ) Notice: Subject to any disclaimer, the term of this patent is extended or adjusted under 35 U.S.C. 154(b) by 772 days.

(21) Appl. No.: 10/054,949

(22) Filed: Jan. 25, 2002

(65) Prior Publication Data

US 2002/0110080 A1 Aug. 15, 2002

(30) Foreign Application Priority Data

Jan. 29, 2001 (JP) .......................................... 2001-020739
Jan. 18, 2002 (JP) .......................................... 2002-010651

(51) Int. Cl.$^7$ ................................................ G11B 7/24
(52) U.S. Cl. ............................... 369/275.4; 369/44.26; 428/64.4

(58) Field of Search ....................... 369/275.3, 275.2, 369/275.1, 275.5, 44.26, 44.37, 44.16, 112.05, 283, 288; 428/64.4, 64.1, 64.5, 64.6

(56) References Cited

U.S. PATENT DOCUMENTS

| | | | | |
|---|---|---|---|---|
| 5,940,364 A | * | 8/1999 | Ogata et al. | 369/275.4 |
| 6,165,579 A | * | 12/2000 | Nakamura | 428/64.1 |
| 6,215,758 B1 | * | 4/2001 | Horimai et al. | 369/275.3 |
| 6,778,474 B2 | * | 8/2004 | Nishi | 369/44.26 |

* cited by examiner

Primary Examiner—Ali Neyzari
(74) Attorney, Agent, or Firm—Oblon, Spivak, McClelland, Maier & Neustadt, P.C.

(57) ABSTRACT

Disclosed is an optical recording disk which records information using lands and grooves and has a shallow & deep groove structure in which groove is different in depth from the other groove adjacent thereto. In the optical recording disk, a playback signal is stabilized by setting the level ratio of an AC component of a sum signal to a DC component of the sum signal in a plurality of spots to be equal to or smaller than a predetermined value.

6 Claims, 6 Drawing Sheets

OPTICAL RECORDING MEDIUM AND STAMPER FOR MANUFACTURING THE SAME

BACKGROUND OF THE INVENTION

1. Field of the Invention

The present invention relates to an optical recording medium and a stamper for manufacturing the optical recording medium which provides conditions under which a playback signal is stabilized in the optical recording medium which records information using lands and grooves and has a shallow & deep structure with one groove different in depth from the other groove.

2. Description of the Related Art

In writable optical disks such as a magnetooptical disk or a phase change recording disk, a groove is typically formed along a recording track on a disk substrate. The groove here refers to a so-called guide groove that is formed along a recording track and is mainly intended to assist tracking servo. A region present between grooves is referred to as a land.

To achieve a high density of recording, increasing a track pitch is as important as increasing a line density. The following methods are available to increase the track pitch in a recording mode in which signals are recorded in both the land and the groove: a land & groove method and a shallow & deep groove method which has been proposed in Japanese Unexamined Patent Application Publication No. 11-296910 which is assigned to the same assignee of the present invention. The shallow & deep method employs a pair of two spiralling grooves, one shallow and the other deep, with a land interposed therebetween.

Discussed below is the shallow & deep groove method having the grooves varied and recording a signal on the land thereof as disclosed in Japanese Unexamined Patent Application Publication No. 11-296910.

In conventional optical disks, the depth and the width of the grooves of adjacent tracks remain unchanged. If the track pitch is made fine in this structure, the spatial frequency of the track exceeds an MTF (Modulation Transfer Function), and no tracking signal is generated. Although there is the potential that the recording density will be increased in recording and playback characteristics, the tracking pitch is subject to a limitation, in practice, because of an inability to track. In the shallow & deep groove method, the depth of the grooves is alternately changed. In this way, a frequency component half the track pitch is generated, and a tracking error signal is obtained. If one track is split into two, the two split tracks become mirror symmetrical to each other, thereby helping regulate recording characteristics. In contrast, in the land & groove method, two different portions, namely, the land and groove, record a signal, and there occurs variations in recording characteristics. The shallow & deep groove method has this advantage over the land & groove method.

In the shallow & deep groove method, the tracking error signal has the period of two tracks. A difference signal and a sum signal in this method are thus different from those in the normal tracking method. The difference signal and the sum signal become different in the magnitudes thereof depending on the depths of the two grooves. The sum signal refers to a sum of a first optically detected output signal resulting from the reflection and diffraction of a light beam and a second optically detected output signal resulting from the reflection and diffraction of the light beam. The difference signal is also referred to as a push-pull signal. The sum signal is also referred to as a cross-track signal.

To perform tracking servo using the push-pull signal in the current high-recording density optical disk, a push-pull signal amplitude ratio needs to be 0.15 or greater. To stably seek a track using the cross-track signal, the cross-track signal needs to be 0.06 or more. The push-pull signal amplitude ratio is a ratio of an AC component of the push-pull signal to a mirror reflected component, namely, the maximum value of the sum signal on a mirror surface. The cross-track signal amplitude ratio is a ratio of an AC component of the cross-track signal to a mirror reflected component of the cross-track signal.

The shallow groove as the first groove in a shallow & deep groove optical disk is set to be deeper than that disclosed in Japanese Unexamined Patent Application Publication No. 11-296910, and the second groove is set to be even deeper. With this arrangement, a higher density recording type optical disk is contemplated.

The shallow and deep groove method may be implemented in an optical disk of the type that a recording mark is detected through the Domain Wall Displacement Detection (DWDD). The DWDD is a technique to read a recording mark smaller than an optical spot during playback by expanding a magnetic domain by means of thermal distributions induced by the optical spot. Since the DWDD allows the edge of each mark to be neatly detected, it is appropriate for use in replaying data from a magnetooptical disk that employs a mark edge recording method.

It is said that the grooves need to be deeper than a certain depth, for example, 100 nm in the DWDD when an optical disk of the type that replays a recorded signal through the DWDD is combined with the shallow & deep groove method. In this case, the first groove must be 100 nm, and the second groove must be deeper than that.

SUMMARY OF THE INVENTION

The present invention in one aspect relates to an optical recording medium which data is recorded onto and/or played back from with a light beam directed thereto, and includes a land which spirally runs on the recording medium, a first groove formed along one surface of the land and having a depth of d1, and a second groove formed along the other surface of the land and having a depth of d2, which is different from the depth of d1 of the first groove, wherein two optical detectors symmetrically arranged with respect to the center of a track formed of the land and the grooves detect light beams that are reflected from the optical recording medium when the optical recording medium is irradiated with the light beam, and the depths d1 and d2 satisfy the condition that the level ratio of an AC component of a sum signal represented by A+B to a DC component of the sum signal is 0.15 or smaller where A is the output level of the one optical detector and B is the output level of the other optical detector.

The present invention in another aspect relates to a stamper for manufacturing an optical recording medium which data is recorded onto and/or played back from with a light beam directed thereto, and the optical recording medium includes a land which spirally runs on the recording medium, a first groove formed along one surface of the land and having a depth of d1, and a second groove formed along the other surface of the land and having a depth of d2, which is different from the depth of d1 of the first groove, wherein two optical detectors symmetrically arranged with respect to the center of a track formed of the land and the grooves detect light beams that are reflected from the optical recording medium when the optical recording medium is irradiated with the light beam, and the depths d1 and d2 satisfy the condition that the level ratio of an AC component of a sum signal represented by A+B to a DC component of the sum signal is 0.15 or smaller where A is the output level of the one optical detector and B is the output level of the other optical detector.

DESCRIPTION OF THE PREFERRED EMBODIMENTS

Figure 1:
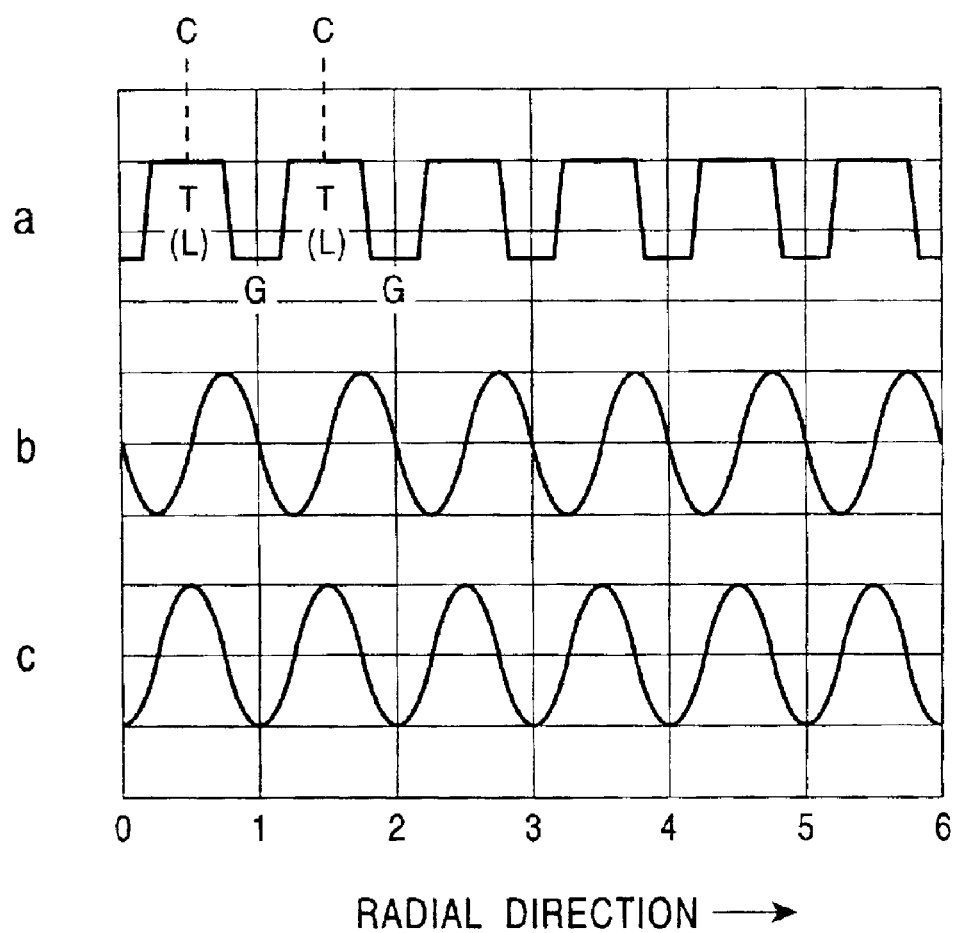
FIG. 1 is a waveform diagram of a difference signal and a sum signal of a conventional optical disk that does not adopt a shallow & deep groove method.

Referring to the drawings, one embodiment of the present invention will now be discussed.

A magnetooptical disk implementing the present invention is first discussed below. The magnetooptical disk records a mark through the magnetooptical (MO) effect and detects a recording mark through the DWDD.

Figure 2:
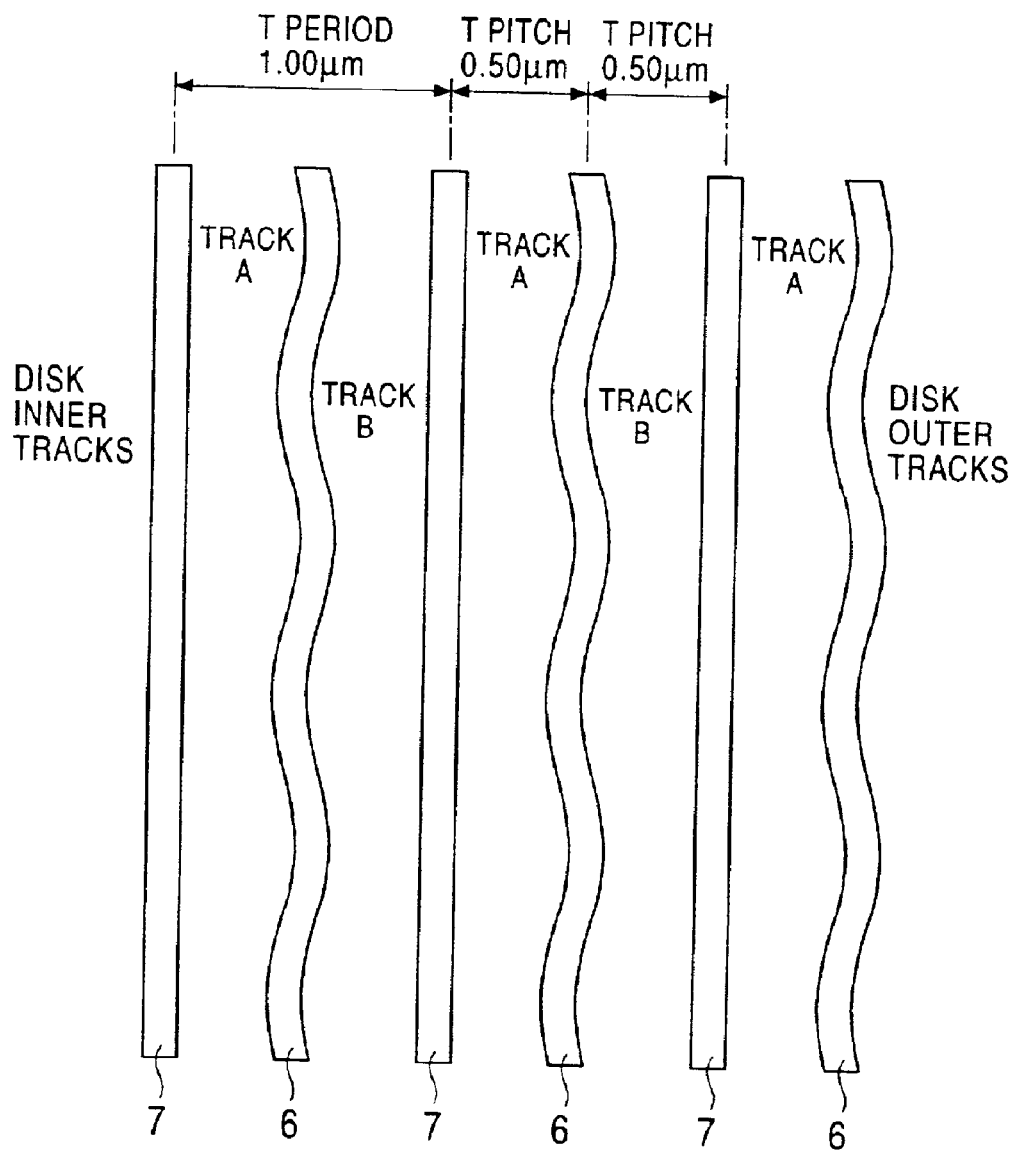
FIG. 2 illustrates in enlargement a portion of a recording area of a magnetooptical disk of the present invention.

Referring to FIG. 2, the magnetooptical disk includes a first recording track A, a second recording track B, a first groove 6 that spirally runs between the first recording track A and the second recording track B and has a depth of d1, and a second groove 7 that spirally runs between the first recording track A and the second recording track B in a double spiral fashion with the first groove 6 and has a depth of d2 (d1<d2). A first optically detected output is obtained in response to a light beam reflected and diffracted from the first groove 6 and a second optically detected output is obtained in response to a light beam reflected and diffracted from the second groove 7. The depth d1 of the first groove 6 and the depth d2 of the second groove 7 are determined so that the level ratio of the AC component of the sum of the first and second optically detected outputs to the DC component of the sum of the first and second optically detected outputs is 0.15 or smaller.

The first groove 6 is a wobbling groove that wobbles within an amplitude of ±10 nm with a constant period. Hereinafter, the first groove 6 is also referred to as a wobbling groove 6. The second groove 7 is a straight groove. The magnetooptical disk records address information in the groove by wobbling one groove, i.e., the groove 6. Hereinafter, the second groove 7 is also referred to as a straight groove 7.

The first recording track A is a land formed between the wobbling groove 6 and the straight groove 7 with the inner side thereof in the disk being the straight groove 7. Information signal is recorded on the first recording track A. The second recording track B is a land formed between the wobbling groove 6 and the straight groove 7 with the inner side thereof in the disk being the wobbling groove 6. Information signal is recorded on the second recording track B.

The two grooves configured in a double spiral fashion are here formed of the wobbling groove 6 and the straight groove 7. In the optical disk of the present invention, the two grooves may be both straight grooves. Alternatively, the two grooves may be both wobbling grooves. A wobbling groove has an advantage that the groove itself permits address information to be recorded therewithin. This embodiment having one wobbling and the other straight permits a track to be narrower than the arrangement in which both grooves are wobbled. This embodiment thus permits a high density design.

In this magnetooptical disk 1, a track pitch TPitch is 0.5 μm. The track pitch TPitch is the distance between the center of the wobbling groove 6 and the center of the straight groove 7. Specifically, the center-to-center distance between the wobbling groove 6 and the straight groove 7 is 0.50 μm. The distance between the centers of the adjacent straight grooves 7 is referred to as a track period TPeriod.

Figure 3:
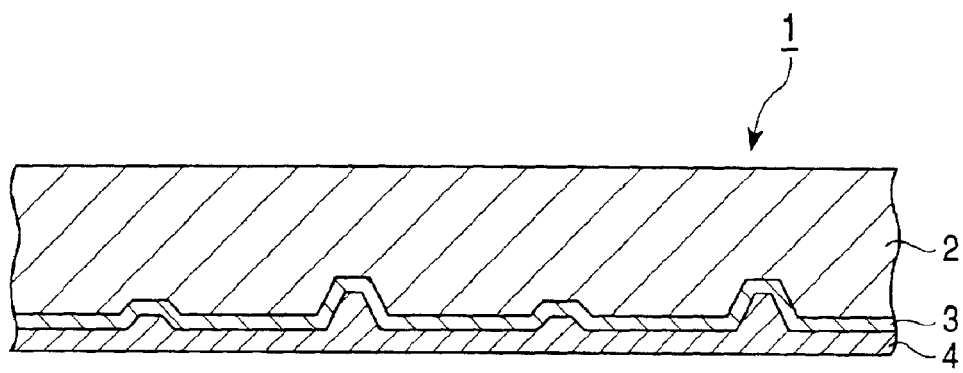
FIG. 3 is a cross-sectional view of a major portion of the magnetooptical disk.

Referring to FIG. 3, the magnetooptical disk 1 includes a disk substrate 2 fabricated of polymethylmethacrylate (PMMA) or polycarbonate (PC), a signal layer 3 to which a signal is recorded through the MO effect and from which a signal is played back through the DWDD, and a protective layer 4 for protecting the signal layer 3. The signal layer 3 is a laminate of a recording sublayer which records a mark which is smaller than an optical spot during playback through an optical pickup, an expansion sublayer from which the small mark is read by expanding a magnetic domain by means of thermal distributions induced by the optical spot during playback through the optical pickup, and a switching sublayer sandwiched between the two sublayers.

The magnetooptical disk 1 implementing the present invention includes the wobbling groove 6 and the straight groove 7 having respectively the depth d1 and the depth d2, which are different from each other. The setting of the depths d1 and d2 will be detailed below.

FIG. 1B and FIG. 1C respectively illustrate the waveforms of a difference signal and a sum signal in the conventional optical disk with no shallow & deep groove method incorporated, with respect to the position of a main spot formed by an optical pickup on a land L and a groove G. FIG. 1A illustrates the depth of the groove G from the land L, namely, a track T. The abscissa represents the radial distance of the disk, and the ordinate represents depth in FIG. 1A, and represents signal level in FIGS. 1B and 1C.

Figure 4:
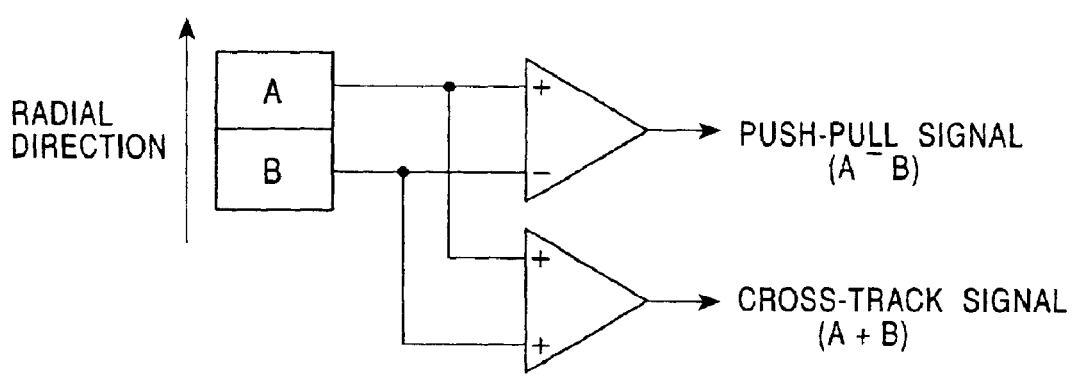
FIG. 4 illustrates a difference signal and a sum signal.

Referring to FIG. 4, the difference signal (A−B) is a difference between the first optically detected output A in response to the light beam reflected and diffracted from the wobbling groove 6 and the second optically detected output B in response to the light beam reflected and diffracted from the straight groove 7. The difference signal is a push-pull signal. The sum signal (A+B) is a sum of the first optically detected output A in response to the light beam reflected and diffracted from the wobbling groove 6 and the second optically detected output B in response to the light beam reflected and diffracted from the straight groove 7. The sum signal is a cross-track signal.

When the main spot is located at the center C of the track T, i.e., the land L in FIGS. 1A–1C, the sum signal illustrated in FIG. 1C is maximized. This is because reflectivity of the track is at a maximum there. The sum signal drops in level as the main spot off-tracked from the center C of the track. Since the derivative of the sum signal at the positive peak value is zero, the rate of change of the sum signal is relatively small when the main spot is off-tracked.

Figure 5:
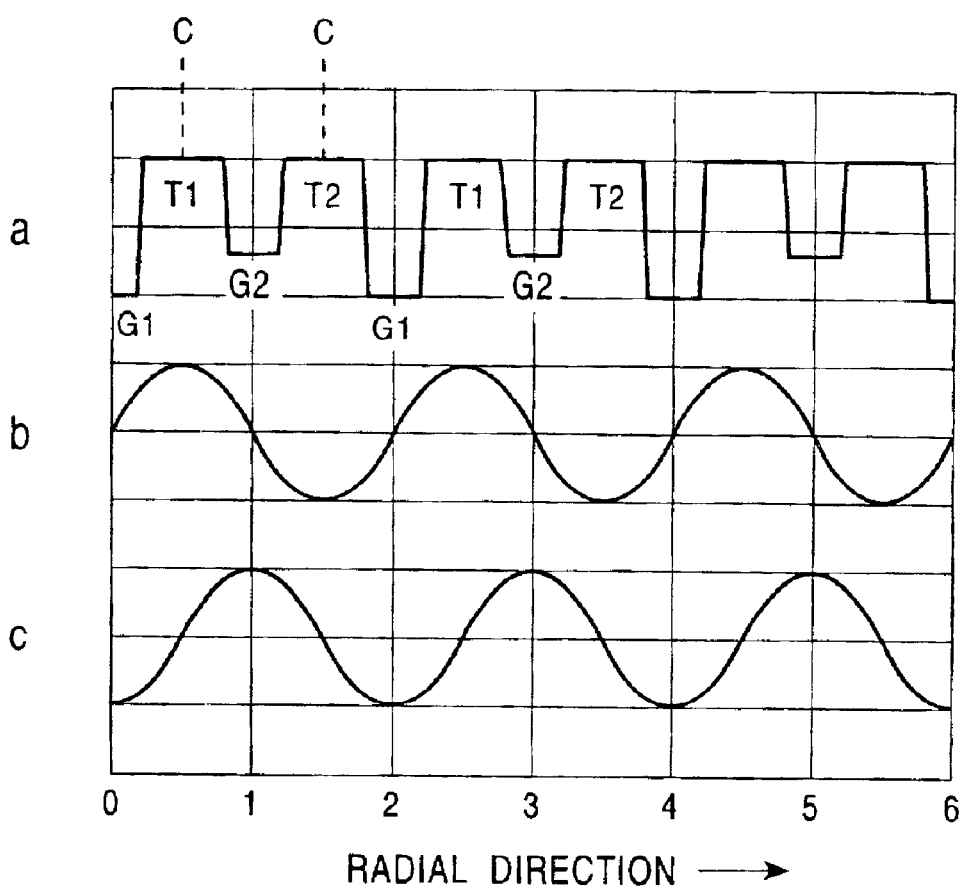
FIG. 5 illustrates a difference signal and a sum signal of an optical disk implementing the shallow & deep groove method.

FIG. 5B and FIG. 5C respectively illustrate the waveforms of a difference signal and a sum signal in an optical disk with a shallow & deep groove method incorporated, with respect to the position of a main spot formed by an optical pickup on a land L and a groove G. FIG. 5A illustrates the depth of the groove G from the land L, namely, a track T. The abscissa represents the radial distance of the disk, and the ordinate represents depth in FIG. 5A, and represents signal level in FIGS. 5B and 5C.

When the main spot is located at the center C of one of the tracks T1 and T2, the sum signal shown in FIG. 5C is equal to the DC component. When the main spot is off-tracked leftwardly or rightwardly from the center of the track T1 or T2, the reflectivity of the track drastically rises or falls as a result of the effect of the AC component and the sum signal is also drastically rises and falls in level. Specifically, the derivative of the sum signal curve is maximized at the center C of the track T1 or T2 as shown in FIG. 5C, and the sum signal curve has a maximum rate of change there. To control the rate of change, the amplitude of the AC component of the sum signal must be reduced.

The track reflectivity affects the playback signal of the recorded information. Since the magnitude of the playback signal in the magnetooptical disk is proportional to the track reflectivity and the Kerr rotation angle, variations in the track reflectivity becomes variations in the playback signal.

Reducing the AC component of the sum signal with respect to the track reflectivity is beneficial in the optical disk having the shallow & deep groove structure. For example, reducing the AC component is particularly effective in the above embodiment in which the shallow & deep groove method is applied to the optical disk of the type that detects marks through the DWDD and features a deep groove.

The reduction of the AC component is also effective when a shallow & deep groove method is implemented in an optical disk such as a phase change recording disk, in which a change in reflectivity is used as a recorded signal, because the variations in the track reflectivity becomes variations in the playback signal.

The conventional optical disk needs the AC component of the sum signal above a certain level to reliably perform a seek operation. In the optical disk of the shallow & deep groove method, however, the AC component of the sum signal is not a requirement. Even if the AC component is zero, a seek operation can be performed.

Although the peak-to-peak value of the AC component of the sum signal is ideally zero, a ratio of the AC component to the DC component on a track of 0.15 or smaller is acceptable in practice. The AC component is not a problem if the condition that the ratio of the AC component to the DC component is 0.15 or smaller is satisfied.

The difference signal illustrated in FIG. 5B is maximized or minimized when the main spot is at the center C of the track T1 or T2. The difference signal falls or rises in level as the main spot is off-tracked from the track center C. The difference signal is at a positive peak or a negative peak at the track center C. As the derivative of the curve of the difference signal is zero there, variations in the difference signal are relatively small when the main spot is off-tracked.

The AC component of the difference signal is preferably large to some degree. To perform tracking servo using the push-pull signal as in the current high recording density optical disk, it is acceptable if the ratio of the AC component of the difference signal to the DC component is 0.15 or greater.

Discussed below is a specific example for setting the depth d1 of the first groove and the depth d2 of the second groove in the magnetooptical disk which implements the shallow & deep groove method and plays back a recorded signal through the DWDD.

When the laser emitted from an optical pickup is a red laser, the conventional art requires a groove at least as deep as 100 nm to reliably perform a DWDD operation without using the shallow & deep groove method. If the shallow & deep groove method is used, the depth of a shallow groove is 100 nm. How deep the deep groove is set to be becomes a concern.

Figure 6:
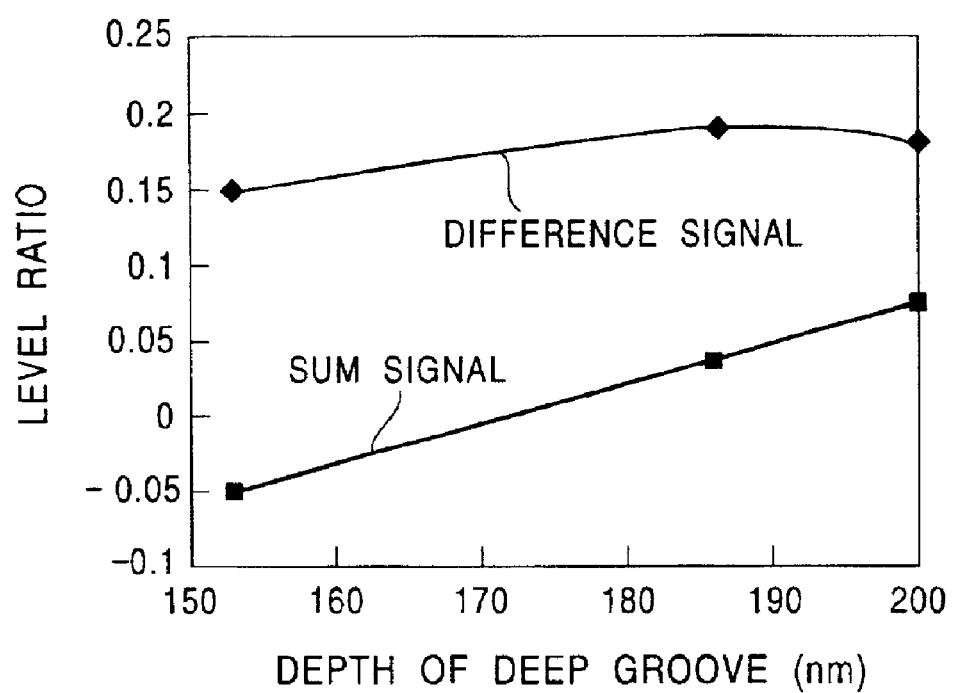
FIG. 6 illustrates a level ratio of an AC component of a sum signal to a DC component of the sum signal and a level ratio of an AC component of a difference signal to a DC component of the difference signal when a second (deep) groove is changed in depth with the depth of a first (shallow) groove kept in depth to 100 nm.

FIG. 6 illustrates the level ratio of the AC component to the DC component in the sum signal and the level ratio of the AC component to the DC component in the difference signal when the first shallow groove is 100 nm. The wavelength $\lambda$ of an irradiating laser beam is 660 nm, and the numerical aperture NA of an optical system in use is 0.52.

The depth of the second groove d2 falls within a range of from 153 to 200 nm to satisfy the condition that the level ratio of the AC component to the DC component in the difference signal is 0.15 or greater and the condition that the level ratio of the AC component to the DC component in the sum signal is 0.15. Since the level ratio of the AC component to the DC component in the sum signal is ideally zero as already discussed, the depth d2 is preferably approximately 170 nm. The depth d2 as large as 200 nm is also acceptable because it still satisfies the above conditions. However, the depth d2 of 200 nm is so deep that the molding of the disk becomes difficult.

When the shallow & deep groove method is implemented in the magnetooptical disk that plays back the recorded signal through the DWDD, the depth d1 of the first groove and the depth d2 of the second groove are set to be d1=100 nm and d2=170 nm.

The magnetooptical disk shown in FIG. 2 having the wobbling groove 6 as deep as 100 nm as the depth d1 and the straight groove 7 as deep as 172 nm as the depth d2 provides a signal at a sufficiently high level required for tracking servo.

Figure 7:
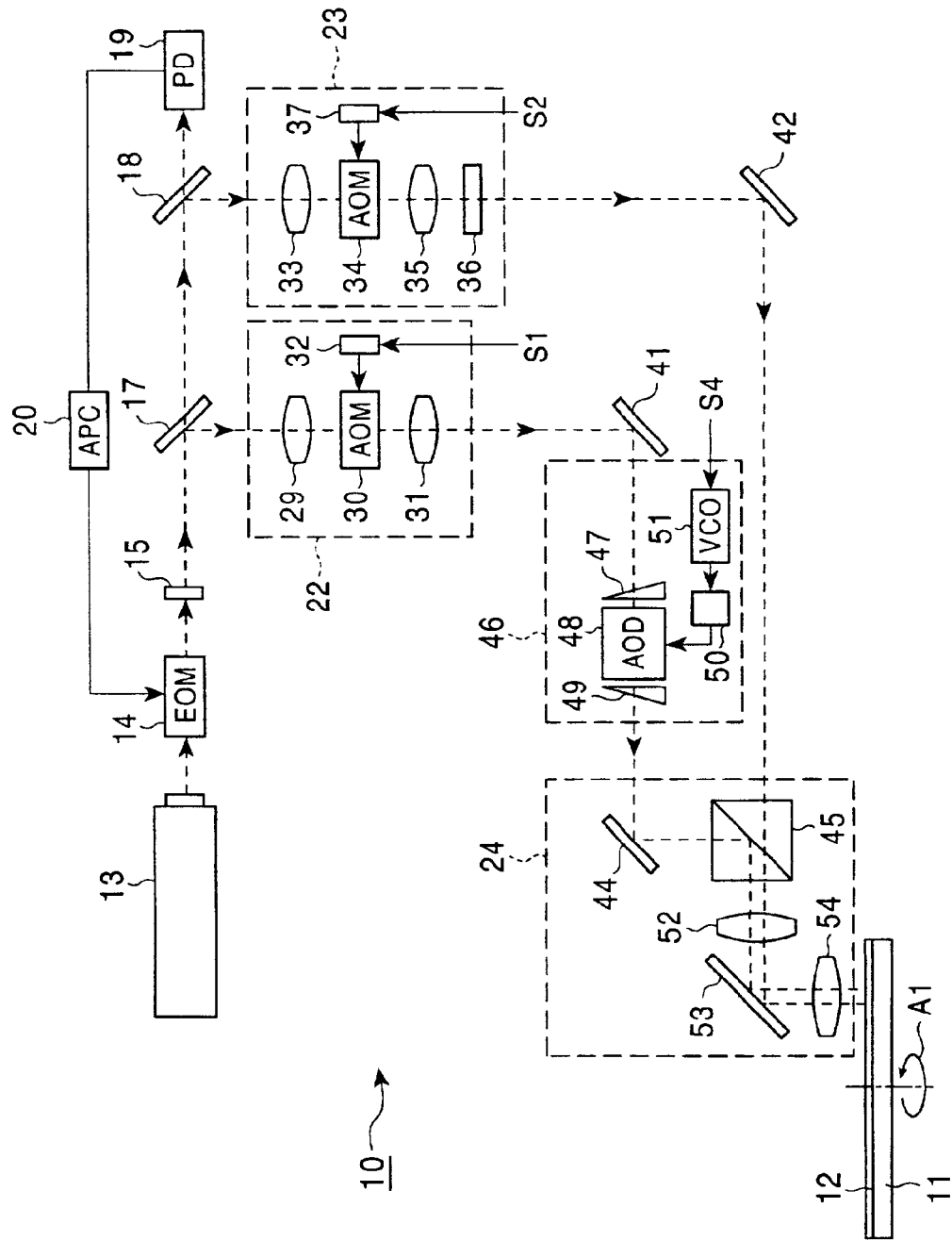
FIG. 7 illustrates an optical system in a laser cutting device which is used to manufacture an optical recording medium of the present invention and a stamper for manufacturing the optical recording medium.

A laser cutting device is used to produce a stamper which is in turn used to manufacture the magnetooptical disk. Referring to FIG. 7, one example of the laser cutting device used to manufacture an optical recording medium is detailed below.

The laser cutting device 10 shown in FIG. 7 exposes a photoresist 12 coated on a glass substrate 11 to light, thereby forming a latent image on the photoresist 12. When the latent image is formed on the photoresist 12 by the laser cutting device 10, the glass substrate 11 coated with the photoresist 12 is mounted on a rotary drive unit arranged on a movable optical table. To expose the photoresist 12 to light, the glass substrate 11 is rotated by the rotary drive unit in a direction represented by an arrow A1 so that the photoresist 12 is entirely exposed to light to form a desired pattern, while being moved in translation by the movable optical table at the same time.

The laser cutting device 10 allows the photoresist 12 to be exposed to two exposure beams. The two exposure beams thus respectively form latent images, one corresponding to the wobbling groove 6 and the other corresponding to the straight groove 7. Specifically, the laser cutting device 10 produces the latent image corresponding to the wobbling groove 6 by a first exposure light beam, and the latent image corresponding to the straight groove 7 by a second exposure light beam.

The laser cutting device 10 includes a light source 13 for emitting a laser light beam, an electro optical modulator (EOM) 14 for adjusting the intensity of the laser light beam emitted from the light source 13, an analyzer 15 arranged on the optical axis of the laser light emitted from the electro optical modulator 14, a first beam splitter 17 for splitting the laser light beam transmitted through the analyzer 15 into a reflected light beam and a transmitted light beam, a second beam splitter 18 for splitting the laser light beam transmitted through the first beam splitter 17 into a reflected light beam and a transmitted light beam, a photodetector (PD) 19 for detecting the laser light beam transmitted through the second beam splitter 18, and an auto power controller (APC) 20 which adjusts the intensity of the laser light beam output from the electro optical modulator 14 by applying a signal electric field to the electro optical modulator 14.

In the laser cutting device 10, the laser light beam emitted from the light source 13 is adjusted to a predetermined level by the electro optical modulator 14. The electro optical modulator 14 is driven by the signal electric field applied by the auto power controller 20. The laser light beam then enters the analyzer 15. The analyzer 15 allows an S-polarized light beam to be transmitted therethrough, and the laser light beam transmitted through the analyzer 15 is thus an S-polarized light beam only.

The light source 13 may be of any type. Preferably, the light source 13 outputs a laser light beam at a relatively short wavelength. Specifically, the light source 13 may be a Kr laser device outputting a laser light beam of wavelength $\lambda$ of 351 nm, or may be a He—Cd laser device outputting a laser light beam of wavelength $\lambda$ of 442 nm.

The S-polarized laser light beam transmitted through the analyzer 15 is split into a reflected light beam and a transmitted light beam by the first beam splitter 17. The laser light beam transmitted through the first beam splitter 17 is split into a reflected laser light beam and a transmitted light beam by the second beam splitter 18. In the laser cutting device 10, the laser light beam reflected from the first beam splitter 17 becomes a first exposure light beam and the laser light beam reflected from the second beam splitter 18 becomes a second exposure light beam.

The photodetector 19 detects the light intensity of the laser light beam transmitted through the second beam splitter 18 and outputs a signal responsive to the light intensity to the auto power controller 20. In response to the signal from the photodetector 19, the auto power controller 20 adjusts a signal electric field applied to the electro optical modulator 14 so that the light intensity level detected by the photodetector 19 is fixed to a predetermined level. In this way, auto power control (APC) is performed so that the light intensity of the laser light beam output from the electro optical modulator 14 remains constant. Noise-free and stable laser light beams result.

The laser cutting device 10 includes a first optical modulator system 22 which light-intensity modulates the laser light beam reflected from the first beam splitter 17, a second optical modulator system 23 which light-intensity modulates the light beam reflected from the second beam splitter 18, and an optical system 24 which synthesizes the light beams light-intensity modulated by the first and second optical modulator systems 22 and 23 and focuses the synthesized laser light beam onto the photoresist 12.

The first exposure light beam reflected from the first beam splitter 17 is guided to the first optical modulator system 22. The first optical modulator system 22 light-intensity modulates the first exposure light beam. The second exposure light beam reflected from the second beam splitter 18 is guided to the second optical modulator system 23. The second optical modulator system 23 light-intensity modulates the second exposure light beam.

The first exposure light beam incident on the first optical modulator system 22 is then condensed by a condenser lens 29, and is then input to an acousto-optical modulator (AOM) 30. The acousto-optical modulator 30 light-intensity modulates the first exposure light beam in accordance with a desired exposure pattern. The acousto-optical element used in the acousto-optical modulator 30 is preferably fabricated of tellurium dioxide ($TeO_2$). The first exposure light beam, light-intensity modulated by the acousto-optical modulator 30, is then collimated by a collimator lens 31, and is then output from the first optical modulator system 22.

The acousto-optical modulator 30 includes a driver 32 for driving the acousto-optical modulator 30 itself. During exposure of the photoresist 12, a signal S1 in accordance with the desired exposure pattern is input to the driver 32. In response to the signal S1, the driver 32 drives the acousto-optical modulator 30, which in turn light-intensity modulates the first exposure light beam.

Specifically, when the latent image having a groove pattern for the wobbling groove 6 having a constant depth is formed in the photoresist 12, a DC signal at a constant level is input to the driver 32. In response to the DC signal, the driver 32 drives the acousto-optical modulator 30. The first exposure light beam is then light-intensity modulated in accordance with the desired groove pattern.

The second exposure light beam incident on the second optical modulator system 23 is condensed by a condenser lens 33, and is then input to an acousto-optical modulator 34. The acousto-optical modulator 34 light-intensity modulates the second exposure light beam in accordance with a desired exposure pattern. The acousto-optical element used in the acousto-optical modulator 34 is preferably fabricated of tellurium dioxide ($TeO_2$). The second exposure light beam, light-intensity modulated by the acousto-optical modulator 34, is then collimated by a collimator lens 35, and is transmitted through a $\lambda/2$-wave plate 36 with the polarization direction thereof rotated by 90 degrees. The second exposure light beam is then output from the second optical modulator system 23.

The acousto-optical modulator 34 includes a driver 37 for driving the acousto-optical modulator 34 itself. During exposure of the photoresist 12, a signal S2 in accordance with the desired exposure pattern is input to the driver 37. In response to the signal S2, the driver 37 drives the acousto-optical modulator 34, which in turn light-intensity modulates the second exposure light beam.

Specifically, when the latent image having a groove pattern for the straight groove 7 having a constant depth is formed in the photoresist 12, a DC signal at a constant level is input to the driver 37. In response to the DC signal, the driver 37 drives the acousto-optical modulator 34. The second exposure light beam is then light-intensity modulated in accordance with the desired groove pattern.

In this way, the first exposure light beam is light-intensity modulated by the first optical modulator system 22 and the second exposure light beam is light-intensity modulated by the second optical modulator system 23. The first exposure light beam output from the first optical modulator system 22 remains to be S-polarized while the second exposure light beam output from the second optical modulator system 23 becomes P-polarized because the second exposure light beam is rotated by 90 degrees in polarization direction through the λ/2-wave plate 36.

The first exposure light beam output from the first optical modulator system 22 is reflected from a mirror 41, is guided in a horizontal direction in parallel with the movable optical table, and is incident on an optical polarization system 46. The first exposure light beam is optically polarized by the optical polarization system 46, and is reflected from a mirror 44 with the travel direction thereof bent by 90 degrees, and is incident on a polarization beam splitter 45. The second exposure light beam output from the second optical modulator system 23 is reflected from a mirror 42, is guided in a horizontal direction in parallel with the movable optical table, and is then incident on the polarization beam splitter 45.

The optical polarization system 46 is used to optically polarize the first exposure light beam in accordance with the wobbling of the wobbling groove. Specifically, the first exposure light beam, output from the first optical modulator system 22 and incident on the optical polarization system 46, enters an acousto-optical deflector (AOD) 48 through a wedge prism 47. The acousto-optical deflector 48 optically polarizes the first exposure light beam in accordance with a desired exposure pattern. The acousto-optical element used in the acousto-optical deflector 48 is preferably fabricated of tellurium dioxide ($TeO_2$). The first exposure light beam optically polarized by the acousto-optical deflector 48 is then output from the optical polarization system 46 through a wedge prism 49.

The acousto-optical deflector 48 includes a driver 50 for driving the acousto-optical deflector 48 itself. The driver 50 receives from a voltage controlled oscillator 51 a high-frequency signal which is FM-modulated by control signal S3 containing address information. During exposure of the photoresist 12, a signal responsive to a desired exposure pattern is input to the driver 50 from the voltage controlled oscillator 51. In response to the signal, the driver 50 drives the acousto-optical deflector 48, which in turn optically polarizes the first exposure light beam.

For example, when the groove is wobbled with a frequency of 84.672 kHz to attach address information thereto, the voltage controlled oscillator 51 supplies the driver 50 with a signal that is obtained by FM-modulating a high-frequency having a central frequency of 224 MHz with the control signal of the frequency of 84.672 kHz. In response to that signal, the driver 50 drives the acousto-optical deflector 48, thereby changing the Bragg angle of the acousto-optical element in the acousto-optical deflector 48. In this way, the first exposure light beam is optically polarized in accordance with the wobbling with the frequency of 84.672 kHz.

The first exposure light beam, which is optically polarized by the optical polarization system 46 in accordance with the wobbling of the wobbling groove 6, is reflected by the mirror 44 with the travel direction thereof bent by 90 degrees, and is then incident on the polarization beam splitter 45.

The polarization beam splitter 45 reflects an S-polarized light beam while transmitting a P-polarized light beam. The first exposure light beam, output from the first optical modulator system 22 and optically polarized by the optical polarization system 46, is S-polarized while the second exposure light beam output from the second optical modulator system 23 is P-polarized. The first exposure light beam is thus reflected from the polarization beam splitter 45 while the second exposure light beam is transmitted through the polarization beam splitter 45. In this way, the first exposure light beam, output from the first optical modulator system 22 and optically polarized by the optical polarization system 46, and the second exposure light beam output from the second optical modulator system 23 are synthesized so that the two light beams travel in the same direction.

The first and second exposure light beams, which are synthesized to travel in the same direction by the polarization beam splitter 45, are set to have a predetermined beam diameter by a magnifying lens 52. The synthesized light beam is then reflected from a mirror 53, and is guided to an objective lens 54. The object lens 54 focuses the synthesized light beam onto the photoresist 12. The photoresist 12 is thus exposed to the light beam and the latent image is formed on the photoresist 12. As already discussed, the glass substrate 11 coated with the photoresist 12 is then rotated by the rotary drive unit in a direction represented by an arrow A1 so that the photoresist 12 is entirely exposed to the light beam to form a desired pattern, while being moved in translation by the movable optical table. As a result, the latent image corresponding to the irradiation paths of the first and second exposure light beams is formed on the entire surface of the photoresist 12.

The objective lens 54 for focusing the exposure light beams on the photoresist 12 has preferably a larger numerical aperture NA to achieve a finer groove pattern. Specifically, the objective lens 54 preferably has a numerical aperture NA of 0.9 or so.

When the first and second exposure light beams are focused onto the photoresist 12, the magnifying lens 52 changes the beam diameters of the first and second exposure light beams, thereby changing the effective numerical aperture to the objective lens 54. In this way, the spot diameters of the first and second exposure light beams focused onto the photoresist 12 are changed.

The first exposure light beam incident on the polarization beam splitter 45 is synthesized with the second exposure light beam on the reflective surface of the polarization beam splitter 45. The polarization beam splitter 45 is arranged so that the reflective surface thereof has an appropriate angle of reflection with respect to the direction of travel of the light beam that exit as a result of synthesis of the first and second exposure light beams.

Specifically, the angle of reflection at the reflective surface of the polarization beam splitter 45 is set so that the radial distance between a spot by the first exposure light beam and a spot by the second exposure light beam equals the track pitch TPitch. In this way, the first exposure light beam irradiates a portion corresponding to the wobbling groove 6 while the second exposure light beam irradiates a portion corresponding to the straight groove 7.

Since the laser cutting device 10 includes the optical system for the first exposure light beam for forming the latent image for the wobbling groove 6 and the optical system for the second exposure light beam for forming the latent image for the straight groove 7, the laser cutting device 10 itself collectively produces the latent image of the wobbling groove 6 and the latent image of the straight groove 7. By adjusting the orientation of the polarization beam splitter 45 synthesizing the first exposure light beam and the second exposure light beam in the laser cutting device 10, the position irradiated with the first exposure light beam and the position irradiated with the second exposure light beam are easily controlled.

The method of manufacturing the magnetooptical disk 1 shown in FIG. 2 and FIG. 3 is discussed in detail below.

When the magnetooptical disk 1 is manufactured, an optical recording medium manufacturing stamper having embossed patterns corresponding to the wobbling groove 6 and the straight groove 7, is first produced in a stamper process.

In the stamper process, a disk-like glass substrate 11 with the surface thereof polished is cleaned and dried. The photoresist 12, which is a photosensitive material, is applied onto the glass substrate 11. The laser cutting device 10 irradiates the photoresist 12 with the exposure light beams. The latent images of the wobbling groove 6 and the straight groove 7 are thus formed on the photoresist 12.

When an evaluation magnetooptical disk discussed later is manufactured, a Kr laser device emitting a laser light beam having a wavelength $\lambda$ of 351 nm is used for the light source 13 in the laser cutting device 10. The objective lens 54 for focusing the first and second exposure light beams on the photoresist 12 has a numerical aperture NA of 0.9. The magnifying lens 52 has a focal length of 70 mm.

When the laser cutting device 10 exposes the photoresist 12 to the first exposure light beam and the second exposure light beam, the latent images corresponding to the wobbling groove 6 and the straight groove 7 are thus formed on the photoresist 12.

When the latent image of the wobbling groove 6 is formed by exposing the photoresist 12 to the first exposure light beam, the first exposure light beam is light-intensity modulated by the first optical modulator system 22 and then optically polarized by the optical polarization system 46.

Specifically, the constant level DC is first input to the driver 32. In response to the DC signal, the driver 32 drives the acousto-optical modulator 30, which in turn light-intensity modulates the first exposure light beam in accordance with the pattern of the wobbling groove 6. Since the wobbling groove 6 is a continuous and constant-depth groove, the first exposure light beam is light-intensity modulated at a constant light intensity while the latent image of the wobbling groove 6 is formed.

The optical polarization system 46 optically polarizes the first exposure light beam that has been light-intensity modulated by the first optical modulator system 22. Specifically, the high-frequency signal is FM-modulated wit the control signal by the voltage controlled oscillator 51, and is then fed to the driver 50. In response to that signal, the driver 50 drives the acousto-optical deflector 48. The Bragg angle of the acousto-optical element in the acousto-optical deflector 48 is thus changed. The first exposure light beam is optically polarized.

The first exposure light beam, subjected to light-intensity modulation and optical polarization, is then focused onto the photoresist 12 through the objective lens 54. The latent image of the wobbling groove 6 is thus formed on the photoresist 12.

The photoresist 12 is exposed to the second exposure light beam while the photoresist 12 is exposed to the first exposure light beam. The latent image of the straight groove 7 is thus formed on the photoresist 12.

When the latent image of the straight groove 7 is formed on the photoresist 12 by exposing the photoresist 12 to the second exposure light beam, the second exposure light beam is optically polarized by the second optical modulator system 23.

Specifically, the constant level DC is input to the driver 37. In response to the DC signal, the driver 37 drives the acousto-optical modulator 34, which in turn light-intensity modulates the second exposure light beam in accordance with the pattern of the straight groove 7. Since the straight groove 7 is a continuous and constant-depth groove, the second exposure light beam is light-intensity modulated at a constant light intensity while the latent image of the straight groove 7 is formed.

The second exposure light beam, subjected to light-intensity modulation, is then focused onto the photoresist 12 through the objective lens 54. The latent image of the straight groove 7 is thus formed on the photoresist 12.

The glass substrate 11 coated with the photoresist 12 is then rotated at a predetermined speed while being moved in translation at a predetermined speed when the photoresist 12 is exposed to the exposure light beams to form the latent images of the wobbling groove 6 and the straight groove 7.

Specifically, when an evaluation magnetooptical disk discussed later is manufactured, the rotary speed of the glass substrate 11 is set so that a linear relative speed between the optical spots of the first and second exposure light beams and the photoresist 12 is 1.0 m/s. Furthermore, the glass substrate 11 is moved in translation in a radial direction by the movable optical table by 1.00 $\mu$m or the track period TPeriod per revolution of the glass substrate 11.

The latent images of the wobbling groove 6 and the straight groove 7 are thus formed in a double spiral fashion on the photoresist 12 by exposing the photoresist 12 to the first and second exposure light beams.

When the photoresist 12 is exposed to the first and second exposure light beams, the DC signals input to the drivers 32 and 37 are adjusted in level to set the first exposure light beam to be different from the second exposure light beam in power. In this way, the depth of the wobbling groove 6 and the straight groove 7 become different in depth. In this embodiment, the power of the first exposure light beam is controlled so that the wobbling groove 6 has a depth d1 of 100 nm, and the power of the second exposure light beam is controlled so that the straight groove 7 has a depth d2 of 170 nm or so.

In the laser cutting device 10, the angle of reflection of the reflective surface of the polarization beam splitter 45 is set so that the radial distance between the optical spot of the first exposure light beam and the optical spot of the second exposure light beam is equal to the track pitch TPitch.

When the angle of reflection of the reflective surface of the polarization beam splitter 45 is set in this way, the first exposure light beam produces the latent image of the wobbling groove 6, and the second exposure light beam produces the latent image of the straight groove 7 adjacent to the wobbling groove 6. In other words, the relative position of the wobbling groove 6 and the straight groove 7 is determined by adjusting the orientation of the polarization beam splitter 45.

After the latent images are formed on the photoresist 12, the glass substrate 11 is then mounted on a turn table of a development device in a manner such that the surface of the photoresist 12 looks upward. With the turn table turing, the glass substrate 11 is rotated, while a developer is dropped onto the photoresist 12 in a development process. In this way, an embossed pattern corresponding to the wobbling groove 6 and the straight groove 7 are formed on the glass substrate 11.

An electrically conductive film fabricated of nickel or the like is deposited on the embossed pattern through electroless plating. The glass substrate 11 with the electrically conductive film deposited is placed into an electroforming device. Through electroplating, the electrically conductive film of the glass substrate 11 is plated with a film of Ni or the like to a thickness of 300±5 µm. The plate is then peeled off, and is then cleaned using acetone to remove the photoresist 12 residing on the surface to which the embossed pattern is transferred.

The above process results in an optical recording medium manufacturing stamper formed of the plate to which the embossed pattern formed on the glass substrate 11 is transferred. The optical recording medium manufacturing stamper has the embossed pattern corresponding to the wobbling groove 6 and the straight groove 7.

The optical recording medium manufacturing stamper implements the present invention. Specifically, the optical recording medium manufacturing stamper is used to manufacture the magnetooptical disk 1 which has the wobbling groove 6 and the straight groove 7 running along the recording track. The stamper also includes a double spiral configuration with a first groove pattern corresponding to the embossed pattern of the wobbling groove 6 and a second groove pattern corresponding to the embossed pattern of the straight groove 7. The first groove pattern and the second groove pattern are different to each other in depth.

As the transfer process, a photopolymerization process, e.g., a so-called 2P process may be used to manufacture a disk substrate with the embossed surface of the stamper transferred thereto.

Specifically, photopolymer is applied in a smooth film onto the embossed surface of the stamper, thereby forming a photopolymer layer. A base plate is then tightly attached onto the photopolymer layer paying attention not to permit dust included thereinto. The base plate typically has a thickness of 1.2 mm and a refractive index of 1.49 and is fabricated of methacrylate.

The photopolymer layer is then cured by irradiating it with ultraviolet light. Peeling the stamper results in a disk substrate 2 having the embossed surface to which the surface of the stamper is transferred.

The disk substrate 2 is manufactured using the 2P process to precisely transfer the embossed pattern formed on the stamper to the disk substrate 2. When the disk substrates 2 are mass-produced, they may be manufactured through injection molding using a transparent resin such as polymethylmethacrylate or polycarbonate.

In a film forming process, a recording layer 3 and a protective layer 4 are formed on the disk substrate 2 to which the surface configuration of the stamper is transferred. Specifically, a first dielectric layer fabricated of SiN or the like, a perpendicular magnetic recording layer fabricated of a TeFeCo alloy, and a second dielectric layer fabricated of SiN or the like are successively formed on the embossed surface of the disk substrate 2 using a sputtering technique. Thus, the first dielectric layer, the perpendicular magnetic recording layer, and the second dielectric layer are laminated. An ultraviolet-curing resin is then applied onto the recording layer 3 through spin coating, and the ultraviolet-curing resin is then irradiated with ultraviolet light. The protective layer 4 is thus formed. The magnetooptical disk 1 results.

The optical recording medium of the present invention sets the depth of the second groove with respect to the depth of the first groove so that the condition that the AC component of the sum signal to the DC component thereof is equal to or smaller than 0.15 is satisfied. The first shallow groove and the second deep groove have proper depths when the shallow & deep groove method is applied to the originally deep grooves of the optical disk of the type that detects the recording marks through the DWDD.

The optical recording medium manufacturing stamper sets the depth of the second groove with respect to the depth of the first groove so that the condition that the level ratio of the AC component to the DC component of the sum of the first optically detected output reflected and diffracted from the first groove and the second optically detected output reflected and diffracted from the second groove is 0.15 or smaller is satisfied. The stamper thus manufactures the optical recording medium in which the first shallow groove and the second deep groove have proper depths when the shallow & deep groove method is applied to the originally deep grooves of the optical disk of the type that detects the recording marks through the DWDD.

What is claimed is:

1. An optical recording medium which data is recorded onto and/or played back from with a light beam directed thereto, comprising:

a land which spirally runs on the recording medium;

a first groove formed along one surface of the land and having a depth of d1; and a second groove formed along the other surface of the land and having a depth of d2, which is different from the depth of d1 of the first groove, wherein two optical detectors symmetrically arranged with respect to the center of a track formed of the land or the grooves detect light beams that are reflected from the optical recording medium when the optical recording medium is irradiated with the light beam, and the depths d1 and d2 satisfy the condition that the level ratio of an AC component of a sum signal represented by A+B to a DC component of the sum signal is 0.15 or smaller where A is the output level of the one optical detector and B is the output level of the other optical detector.

2. An optical recording medium according to claim 1, wherein the depths d1 and d2 further satisfy the condition that the level ratio of an AC component of a difference signal represented by A−B to a DC component of the difference signal is 0.15 or greater.

3. An optical recording medium according to claim 1, wherein at least one of the first and second grooves is a wobbling groove that at least partly wobbly runs.

4. A stamper for manufacturing an optical recording medium which data is recorded onto and/or played back from with a light beam directed thereto, the optical recording medium comprising:

a land which spirally runs on the recording medium;

a first groove formed along one surface of the land and having a depth of d1; and a second groove formed along the other surface of the land and having a depth of d2, which is different from the depth of d1 of the first groove, wherein two optical detectors arranged with respect to the center of a track formed of the land or the grooves detect light beams that are reflected from the optical recording medium when the optical recording medium is irradiated with the light beam, and the depths d1 and d2 satisfy the condition that the level ratio of an AC component of a sum signal represented by A+B to a DC component of the sum signal is 0.15 or smaller where A is the output level of the one optical detector and B is the output level of the other optical detector.

5. A stamper according to claim 4, wherein the depths d1 and d2 further satisfy the condition that the level ratio of an AC component of a difference signal represented by A−B to a DC component of the difference signal is 0.15 or greater.

6. A stamper according to claim 5, wherein at least one of the first and second grooves is a wobbling groove that at least partly wobbly runs.

* * * * *